(12) United States Patent
Szebenyei et al.

(10) Patent No.: US 12,282,110 B2
(45) Date of Patent: Apr. 22, 2025

(54) TECHNIQUE FOR UPDATING A POSITIONING CONFIGURATION

(71) Applicant: Telefonaktiebolaget LM Ericsson (publ), Stockholm (SE)

(72) Inventors: Mate Szebenyei, Maglod (HU); Zsófia Kallus, Budapest (HU); Péter Hága, Budapest (HU); Tamas Borsos, Budapest (HU)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 501 days.

(21) Appl. No.: 17/629,544

(22) PCT Filed: Aug. 6, 2019

(86) PCT No.: PCT/EP2019/071121
§ 371 (c)(1),
(2) Date: Jan. 24, 2022

(87) PCT Pub. No.: WO2021/023377
PCT Pub. Date: Feb. 11, 2021

(65) Prior Publication Data
US 2022/0268875 A1    Aug. 25, 2022

(51) Int. Cl.
*G01S 5/00* (2006.01)
*G01S 5/02* (2010.01)
(Continued)

(52) U.S. Cl.
CPC .......... *G01S 5/0289* (2013.01); *G01S 5/0009* (2013.01); *G01S 5/0221* (2013.01); *G01S 13/74* (2013.01); *H04W 4/33* (2018.02); *G06Q 10/087* (2013.01)

(58) Field of Classification Search
CPC .... G01S 5/0289; G01S 5/0009; G01S 5/0221; G01S 13/74; G06Q 10/087
See application file for complete search history.

(56) References Cited

U.S. PATENT DOCUMENTS 10,132,917 B2 * 11/2018 Jalali ..................... G01S 5/0289
11,876,941 B1 *  1/2024 Suiter ................... G06F 40/169
(Continued)

FOREIGN PATENT DOCUMENTS

| CN | 107911786 A | 4/2018 |
| KR | 20180042546 A | 4/2018 |

OTHER PUBLICATIONS

Jiao, Hailong, et al., "Research on Multi-tag Anti-collision Algorithm Based on UWB Real-time Positioning System", 2016 IEEE Conference on Wireless Sensors (ICWiSe), 2016, 54-58.
(Continued)

*Primary Examiner* — Khai M Nguyen
(74) *Attorney, Agent, or Firm* — Murphy, Bilak & Homiller, PLLC (57) ABSTRACT

A technique for updating a positioning configuration in a positioning system comprising a plurality of anchor nodes for determining positions of tag devices within a localization area using radio technology is disclosed. A method implementation of the technique comprises determining (S202) an updated positioning configuration for at least one of a set of tag devices and a set of anchor nodes of the positioning system based on predefined positioning requirements that depend on a zone of the localization area in which the set of tag devices is currently located, and applying (S204) the updated positioning configuration to the at least one of the set of tag devices and the set of anchor nodes.

19 Claims, 4 Drawing Sheets

Determine an updated positioning configuration for at least one of a set of tag devices and a set of anchor nodes of a positioning system based on predefined positioning requirements that depend on a zone of a localization area in which the set of tag devices is currently located — S202

Apply the updated positioning configuration to the at least one of the set of tag devices and the set of anchor nodes — S204

(51) Int. Cl.
    *G01S 13/74* (2006.01)
    *H04W 4/33* (2018.01)
    *G06Q 10/087* (2023.01)

(56) References Cited

U.S. PATENT DOCUMENTS

| | | | |
|---|---|---|---|
| 12,089,122 B2 * | 9/2024 | Wahl | G01S 5/0205 |
| 2010/0109849 A1 | 5/2010 | Wang et al. | |
| 2012/0115512 A1 | 5/2012 | Grainger et al. | |
| 2013/0038490 A1 * | 2/2013 | Garcia | G01S 13/74 |
| | | | 342/451 |
| 2013/0053002 A1 * | 2/2013 | Hymes | H04W 4/20 |
| | | | 455/414.1 |
| 2015/0091702 A1 | 4/2015 | Gupta et al. | |
| 2015/0241551 A1 | 8/2015 | Jalali | |
| 2015/0319572 A1 | 11/2015 | Jalali et al. | |
| 2017/0131383 A1 * | 5/2017 | Bartov | G01S 13/765 |
| 2018/0091939 A1 | 3/2018 | Venkatraman et al. | |
| 2019/0129446 A1 * | 5/2019 | Kaufmann | G01S 19/46 |
| 2020/0106877 A1 * | 4/2020 | Ledvina | H04W 12/63 |
| 2022/0272504 A1 * | 8/2022 | Hága | G01S 5/0244 |

OTHER PUBLICATIONS

Lachmann, Julia, "UWB: Two Localization Techniques in Comparison", infsoft blog post, <https://www.infsoft.com/blog/uwb-two-localization-techniques-in-comparison>, Aug. 30, 2018, 1-6.

* cited by examiner

TECHNIQUE FOR UPDATING A POSITIONING CONFIGURATION

TECHNICAL FIELD

The present disclosure generally relates to positioning systems. In particular, a technique for updating a positioning configuration in a positioning system comprising a plurality of anchor nodes for determining positions of tag devices within a localization area using radio technology is presented. The technique may be embodied in methods, computer programs, apparatuses and systems.

BACKGROUND

Indoor positioning systems are used in factories to provide solutions for asset and personnel tracking, alert generation and real-time performance measures. While some systems operate with less reliable and lower precision location data (e.g., barcode scanning is a frequently used but error-prone solution for asset tracking in a warehouse, Bluetooth Low Energy (BLE) tags and beacons do not provide highly accurate positioning information either), in advanced industrial environments (e.g., in manufacturing complexes with factory, warehouse and office spaces), more accurate positioning systems are typically employed for monitoring and control management purposes, such as for indoor localization of workers, assets and Automated Guided Vehicles (AGVs), or the like. Accurate positioning can generally be achieved by an infrastructure of anchor nodes with known positions and uniquely identified tag devices attached to the objects and people to be tracked, wherein measurements are performed between the tag devices and the anchor nodes using radio technology (e.g., Bluetooth, WiFi, Ultra-Wideband (UWB) technology, etc.) to determine the precise tag positions. While Received Signal Strength Indication (RSSI) based solutions using WiFi or Bluetooth can achieve accuracies in the meter range, UWB based solutions may generally provide sub-decimeter level positioning, for example.

Positioning systems using different technologies naturally have advantages and disadvantages. For UWB positioning, for example, various methods that use distance measurements between anchors and tag devices may be employed to calculate the tag positions, each having certain benefits and drawbacks. Widely used ranging protocols include Two Way Ranging (TWR) and Time Difference Of Arrival (TDOA), for example, wherein TWR is generally designed for high accuracy positioning without requiring a time synchronized anchor infrastructure, whereas TDOA requires time synchronized anchors but may provide a much higher number of positioning measurements per unit of time. TDOA requires much less radio channel capacity than TWR to achieve the same number of tag-to-anchor distance measurements (e.g., using a TWR mode at 150 Hz, the maximum number of ranges per second is limited to 150 ranges if no collision is present). The limitations of the radio channel bandwidth may as such be a bottleneck in the number of positioning measurements.

By integrating UWB based positioning solutions into an industrial monitoring and process control system, an industrial site may encounter problems with limited channel capacity of UWB technology, for example. As positioning requests (e.g., triggered internally or externally) generally tend to have a high correlation in space and time, emergent burstiness of requests may usually be seen over time. Therefore, even if the system is adequately dimensioned in general, a high number of simultaneous tag measurement requests may still cause collisions and a low measurement success rate may be the consequence. Also, repeated measurements of constant object positions may be unnecessarily costly (e.g., with respect to channel usage, computing time, energy consumption, etc.) and may therefore be generally undesirable.

Traditional techniques only provide partial solutions to such problems. For example, while some prior art solutions aim to dynamically reconfigure their operation to provide improved results, such as higher positioning accuracy, better battery management, etc., these solutions are typically limited to using restricted per device information that does not allow support of a wide range of use cases and consideration of particular requirements in industrial scenarios where complex configurations are needed. Simple motion-based solutions do not save channel capacity in cases where simultaneous motion of a large number of co-located tags triggers an unnecessary parallel measurement flood, for example.

SUMMARY

Accordingly, there is a need for a technique which avoids one or more of the problems discussed above, or other problems.

According to a first aspect, a method for updating a positioning configuration in a positioning system comprising a plurality of anchor nodes for determining positions of tag devices within a localization area using radio technology is provided. The method comprises determining an updated positioning configuration for at least one of a set of tag devices and a set of anchor nodes of the positioning system based on predefined positioning requirements that depend on a zone of the localization area in which the set of tag devices is currently located, and applying the updated positioning configuration to the at least one of the set of tag devices and the set of anchor nodes.

The localization area may comprise a plurality of zones each being associated with different predefined positioning requirements, wherein determining and applying the updated positioning configuration may be performed when the set of tag devices moves from one zone to another zone of the plurality of zones. The predefined positioning requirements may further depend on a tracking classification of the set of tag devices. The updated positioning configuration may further be determined based on positioning related capabilities of tag devices of the set of tag devices.

The updated positioning configuration may further be determined based on results of local measurements performed in the zone of the localization area in which the set of tag devices is currently located. The results of the local measurements may comprise at least one of results of ranging measurements performed by the set of tag devices, results of measurements performed by tag device sensors measuring states of tag devices of the set of tag devices, and results of measurements performed by external sensors measuring environmental states in the zone of the localization area in which the set of tag devices is currently located. The environmental states may relate to utilization rates of communication channels used within the positioning system.

At least some of the results of the local measurements may be indicative of a utilization of capacity limits of the positioning system. When the predefined positioning requirements cannot be fulfilled due to the capacity limits of the positioning system, the method may further comprise generating a report on which requirements cannot be fulfilled. The method may further comprise triggering an alert based on the generated report.

The updated positioning configuration may comprise at least one updated setting regarding at least one of a ranging configuration used for positioning and a communication configuration used for communication within the positioning system.

Each tag device of the set of tag devices may be equipped with a plurality of positioning components to support different positioning technologies, wherein the updated settings regarding the ranging configuration may include a selection of one or more of the positioning technologies to be used for positioning.

The updated settings regarding the ranging configuration may include updated settings regarding a specific positioning technology to be used for positioning, including at least one of a ranging protocol to be used for positioning, a ranging frequency to be applied for positioning, a ranging trigger mechanism to be used for triggering ranging measurements used for positioning, a selection of one of a tag-to-tag ranging mode and a tag-to-anchor ranging mode to be used for positioning, and a power saving mode to be applied when performing ranging measurements.

The selection of the tag-to-tag ranging mode may include determining a master tag device among the set of tag devices with which the remaining tag devices of the set of tag devices perform pairwise proximity based ranging measurements, wherein the master tag device may be configured to perform tag-to-anchor ranging measurements representative for the whole set of tag devices.

In one variant, the ranging trigger mechanism for the remaining tag devices may be movement based, wherein, in accordance with the ranging trigger mechanism, the proximity based ranging measurements performed by the remaining tag devices with the master tag device may be triggered when movement measurements of the remaining tag devices exceed a predetermined threshold. The predetermined threshold may be defined per zone of the localization area. A start time of triggering the proximity based ranging measurements performed by the remaining tag devices with the master tag device may be shifted by a random delay for at least one tag device among the remaining tag devices.

In another variant, the ranging trigger mechanism for the remaining tag devices may be movement based, wherein, in accordance with the ranging trigger mechanism, the proximity based ranging measurements performed by the remaining tag devices with the master tag device may not be triggered until repeated movement of the remaining tag devices is detected. The updated settings regarding the communication configuration may include at least one of a selection of a communication channel to be used for communication within the positioning system and updated settings regarding a radio transmission power used for communication within the positioning system.

According to a second aspect, a computer program product is provided. The computer program product comprises program code portions for performing the method of the first aspect when the computer program product is executed on one or more computing devices (e.g., a processor or a distributed set of processors). The computer program product may be stored on a computer readable recording medium, such as a semiconductor memory, DVD, CD-ROM, and so on.

According to a third aspect, a computing unit for updating a positioning configuration in a positioning system comprising a plurality of anchor nodes for determining positions of tag devices within a localization area using radio technology is provided.

The computing unit comprises at least one processor and at least one memory, wherein the at least one memory contains instructions executable by the at least one processor such that the computing unit is operable to perform any of the method steps presented herein with respect to the first aspect.

According to a fourth aspect, there is provided a system comprising a computing unit according to the third aspect.

BRIEF DESCRIPTION OF THE DRAWINGS

Implementations of the technique presented herein are described herein below with reference to the accompanying drawings, in which.

DETAILED DESCRIPTION

In the following description, for purposes of explanation and not limitation, specific details are set forth in order to provide a thorough understanding of the present disclosure. It will be apparent to one skilled in the art that the present disclosure may be practiced in other embodiments that depart from these specific details.

Those skilled in the art will further appreciate that the steps, services and functions explained herein below may be implemented using individual hardware circuitry, using software functioning in conjunction with a programmed microprocessor or general purpose computer, using one or more Application Specific Integrated Circuits (ASICs) and/or using one or more Digital Signal Processors (DSPs). It will also be appreciated that when the present disclosure is described in terms of a method, it may also be embodied in one or more processors and one or more memories coupled to the one or more processors, wherein the one or more memories are encoded with one or more programs that perform the steps, services and functions disclosed herein when executed by the one or more processors.

Figure 1:
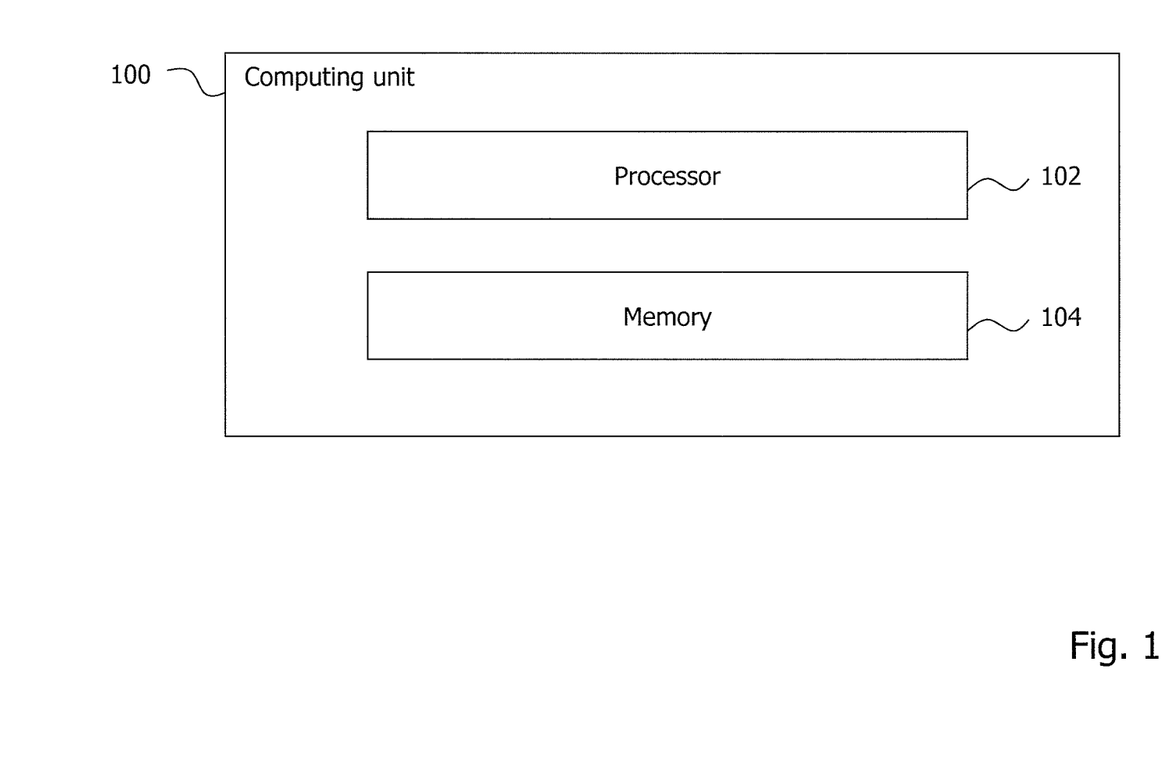
FIG. 1 illustrates an exemplary composition of a computing unit for updating a positioning configuration according to the present disclosure.

FIG. 1 schematically illustrates an exemplary composition of a computing unit 100 for updating a positioning configuration in a positioning system comprising a plurality of anchor nodes for determining positions of tag devices within a localization area using radio technology. The computing unit 100 comprises at least one processor 102 and at least one memory 104, wherein the at least one memory 104 contains instructions executable by the at least one processor 102 such that the computing unit 100 is operable to carry out the method steps described herein below.

It will be understood that the computing unit 100 may be implemented on a physical computing unit or a virtualized computing unit, such as a virtual machine, for example. It will further be appreciated that the computing unit 100 may not necessarily be implemented on a standalone computing unit, but may be implemented as components—realized in software and/or hardware—residing on multiple distributed computing units as well, such as in a cloud computing environment, for example.

Figure 2:
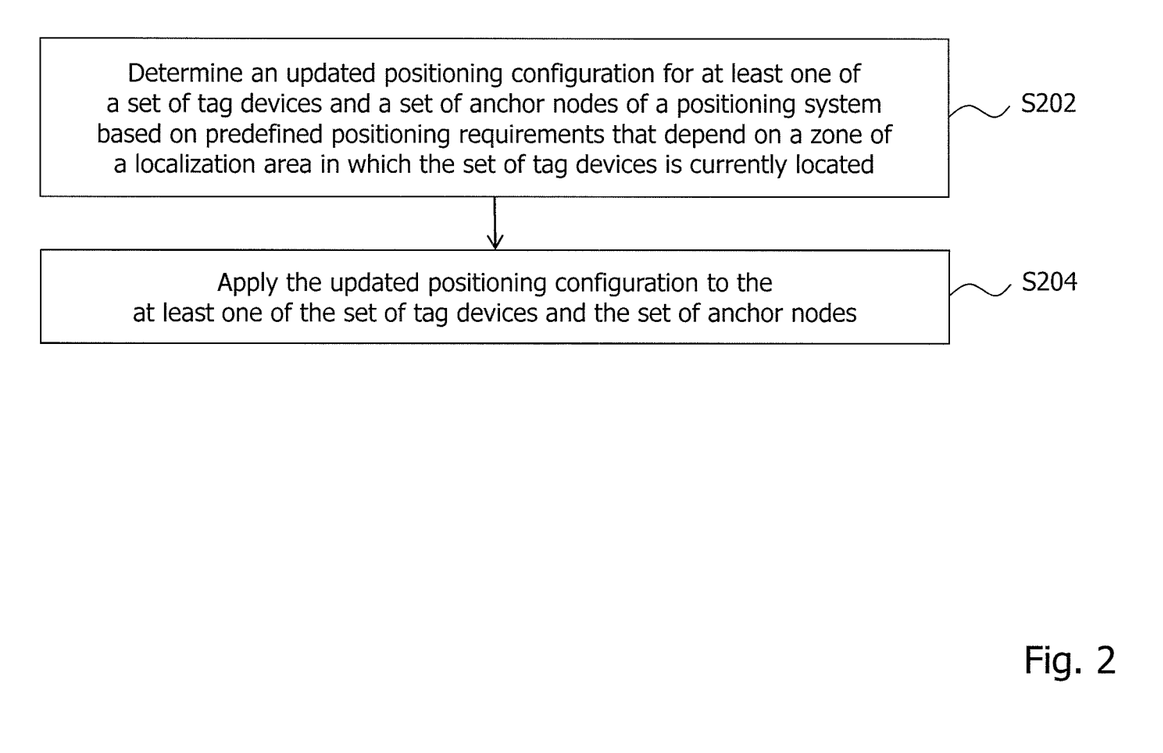
FIG. 2 illustrates a method which may be performed by the computing unit according to the present disclosure.

FIG. 2 illustrates a method which may be performed by the computing unit 100 according to the present disclosure. The method is dedicated to updating a positioning configuration in a positioning system comprising a plurality of anchor nodes for determining positions of tag devices within a localization area using radio technology. In step S202, the computing unit 100 may determine an updated positioning configuration for at least one of a set of tag devices and a set of anchor nodes of the positioning system based on predefined positioning requirements that depend on a zone of the localization area in which the set of tag devices is currently located. In step S204, the computing unit 100 may apply the updated positioning configuration to the at least one of the set of tag devices and the set of anchor nodes.

The method may thus allow dynamically adapting a positioning configuration of tag devices and/or anchor nodes in accordance with positioning requirements that are predefined (or "given") for a particular zone (or "subregion") of the localization area in which the tag devices are currently located. The predefined positioning requirements may correspond to user defined high-level requirements (e.g., use case specific requirements for a particular stage of an industrial process) and may relate to requirements including at least one of a required positioning dimension (e.g., two-dimensional positioning using x/y coordinates, three-dimensional positioning using x/y/z coordinates), a required positioning type (e.g., proximity based tag-to-tag ranging, object relation based ranging, tag-to-anchor ranging, etc.), a required positioning accuracy (e.g., sub-decimeter, meters, etc.), a required positioning certainty (e.g., high/low certainty of correctness of positioning results, which may vary due to obstacles deteriorating positioning quality, for example), a required positioning frequency (e.g., periodical, such as every 100 ms, daily, etc., or event-driven, such as motion-triggered, upon request from external entities, etc.), and required communication characteristics for positioning-related communication (e.g., between tag devices and anchor nodes), for example.

As the concrete positioning requirements may change along an industrial process, zones reflecting different positioning requirements of various stages of an industrial process may be defined and, depending on which zone the set of tags is currently located in, the positioning configuration of the set of tags and/or the corresponding anchor nodes in the zone may be updated to meet the given positioning requirements defined for that zone. In other words, determining the updated positioning configuration based on the predefined positioning requirements may include determining the updated positioning configuration in consideration of the predefined positioning requirements with the aim of (e.g., best possibly) fulfilling all predefined requirements. Once the updated positioning configuration is determined, it may be applied to the set of tag devices and/or the set of anchor nodes as needed. This may involve sending corresponding configuration update messages (or "commands") assigning the determined configurations to the respective tag devices and/or anchor nodes, instructing them to update their configurations accordingly.

The localization area of the positioning system may as such be subdivided into a plurality of zones, each of which may correspond to a stage (or "portion") of an industrial process, such as an industrial production process, wherein each zone may be associated with different predefined positioning requirements. Updating the positioning configuration may generally occur when the set of tags moves (or "transitions") from one zone to another having other positioning requirements. The localization area may thus comprise a plurality of zones each being associated with different predefined positioning requirements, wherein determining and applying the updated positioning configuration may be performed when the set of tags moves from one zone to another zone of the plurality of zones. Zones may be defined (or "identified") by geofences and the positioning configuration update may thus be triggered when the set of tags crosses a geofence that separates two adjacent zones, for example.

In addition to the above-mentioned positioning requirements, further aspects may be taken into consideration when determining the updated positioning configuration. For example, the predefined positioning requirements may be complemented by a tracking classification (or "tracking type") of the tag devices (e.g., indicating whether the respective tag devices are attached to workers, objects or vehicles) and, hence, the predefined positioning requirements may further depend (i.e., may be defined differently depending) on a tracking classification of the set of tag devices. Also, the updated positioning configuration may further be determined based on (or "in consideration of") positioning related capabilities of tag devices of the set of tag devices, such as ranging capabilities of the tag devices, for example.

The updated positioning configuration may further be determined based on results of local measurements performed in (or "with respect to") the zone of the localization area in which the set of tag devices is currently located. Such local measurements may originate from environmental sensors, from sensors of the tag devices to describe their states and/or from the ranging measurements performed by the tag devices. The results of the local measurements may as such comprise at least one of results of ranging measurements performed by the set of tag devices, results of measurements performed by tag device sensors measuring states of tag devices of the set of tag devices, and results of measurements performed by external sensors measuring environmental states in the zone of the localization area in which the set of tag devices is currently located.

Ranging measurements may be performed to determine the tag positions of the set of tags and may be carried out in accordance with known ranging techniques, such as TWR or TDOA, for example. As such, anchor nodes and tag devices may communicate using radio signals to perform two-way timing measurements of the time the signals travel between the anchors and tags to thereby measure the distance therebetween. The position of the tags can then be determined based on the ranging measurements, taking into consideration the known fixed coordinates of the anchor nodes. Similar positioning can be implemented using techniques that consider the signal strength between the anchor nodes and the tag devices, such as the RSSI between anchors and tags, for example. The used radio technology may as such include at least one of Bluetooth, WiFi or UWB technologies, for example. In some variants, the tag devices may be equipped with a plurality of positioning components to support different positioning technologies, such as Bluetooth, WiFi and UWB components, or other components, such as BLE or RFID modules, for example.

The states of the tag devices that are measured by the tag device sensors may include a battery status of the tag devices or reflect any other available sensor data, such as motion sensors data, for example. The measured environmental states in the zone of the localization area may relate to sensor data gathered with respect to the zone and may include monitoring results of wireless communication channels, traffic statistics or other device related statistics, for example. Other examples may include temperatures, vehicle speeds, or conveyor belt speeds observed in the zone. In one variant, the environmental states may relate to utilization rates of communication channels used within the positioning system, such as between the set of tags and the set of anchor nodes, for example.

It will be understood that at least some of the results of the local measurements may be indicative of a utilization of capacity limits of the positioning system (e.g., communication channel utilization rates or ranging activity may indicate whether or not corresponding capacity limits are reached, low tag battery states may indicate diminished position capacity, etc.). When the updated positioning configuration is determined in consideration of the results of the local measurements, the capacity limits of the positioning system and their current utilization may be taken into account so as to (e.g., best possibly) fulfill all predefined positioning requirements, as described above. When it is determined that the predefined positioning requirements cannot be fulfilled due to the capacity limits of the positioning system (e.g., the requirements are above the total system capacity), the method may further comprise generating a report on which requirements cannot be fulfilled. Such report may not only provide insights into which requirements may not be satisfiable, but may also be used to trigger corresponding alarms. The method may thus further comprise triggering an alert based on the generated report, for example.

In view of the above, according to the technique presented herein, predefined positioning requirements (e.g., reflecting requirements for particular industrial use cases) and, in addition, states (e.g., tag locations) and conditions (e.g., tag battery states) ascertained from local measurements as well as tag capabilities (e.g., ranging capabilities) may be taken into consideration to determine an optimal configuration for the tag devices and/or anchor nodes that fulfills the use case specific needs. Other than in traditional systems, the optimal configuration may thus not only be determined based on an individual tag level, but rather taking into account the requirements, states, conditions and capabilities of (possibly even co-existing) positioning systems from a system-level view. In other words, in order to determine an optimal configuration for the tag devices and/or anchor nodes, a system-level optimization problem may be solved, as the constraints may not only be given on the individual level of a single device (e.g., limited communication resources). Rather, a global optimization may be solved, in particular using the results of the local measurements of the system.

The updated positioning configuration may comprise any settings relating to both ranging and communication parameters, logics and algorithms. The updated positioning configuration may thus comprise at least one updated setting regarding at least one of a ranging configuration used for positioning and a communication configuration used for communication within the positioning system (e.g., between the set of tag devices and the set of anchor nodes). As said, each tag device of the set of tag devices may be equipped with a plurality of positioning components to support different positioning technologies. In this case, it may be possible to mix various positioning technologies with their respective configurations. The updated settings regarding the ranging configuration may thus include a selection of one or more positioning technologies (e.g., Bluetooth, WiFi, UWB, BLE, RFID, etc.) to be used for positioning. The selection may result in a switch of one or more positioning technologies used in a previous zone to other positioning technologies when the set of tag devices moves to the current zone, as described above.

Regardless of whether a switch of positioning technologies takes place, the configuration update may also relate to technology-related configuration parameters. The updated settings regarding the ranging configuration may thus include updated settings regarding a specific positioning technology to be used for positioning, including at least one of a ranging protocol to be used for positioning (e.g., TWR, TDOA, etc.), a ranging frequency to be applied for positioning (e.g., defined by a ranging period and interval), a ranging trigger mechanism to be used for triggering ranging measurements used for positioning (e.g., periodic or event-driven, such as motion-triggered ranging, triggered by accelerometers, etc.), a selection of one of a tag-to-tag ranging mode (e.g., ranging to nearest master tag device instead of to anchor nodes) and a tag-to-anchor ranging mode (e.g., ranging to nearby anchor nodes) to be used for positioning, and a power saving mode to be applied when performing ranging measurements (e.g., a sleep mode or policy).

In the tag-to-tag ranging mode, only a predefined master tag device may perform ranging in a tag-to-anchor mode with nearby anchor nodes, whereas positioning of other tag devices in close proximity to the master tag device may be performed relative to the master tag device (instead of relative to the usual anchor nodes). The selection of the tag-to-tag ranging mode may thus include determining a master tag device among the set of tag devices with which the remaining tag devices of the set of tag devices may perform pairwise proximity based ranging measurements, wherein the master tag device may be configured to perform tag-to-anchor ranging measurements which may be representative for the whole set of tag devices.

The tag-to-tag ranging mode may be useful in warehouse scenarios in which multiple objects with attached tag devices are disposed on a single palette, for example. In such settings, the objects may have long sitting times and the attached tag devices may be configured to perform motion-triggered positioning for power saving purposes. If such tag devices are configured by the tag-to-anchor ranging mode, a sudden movement of the single palette may activate the tag devices of all objects disposed on the palette to perform ranges to multiple anchor nodes at the same time. This may lead to channel congestion and consequently to a poor positioning success rate. If such tag devices are configured by the tag-to-tag ranging mode, on the other hand, a single master tag device may be used on the palette to perform tag-to-anchor ranges and the remaining tag devices on the palette may perform pairwise proximity based tag-to-tag ranges with the master tag device so as to save channel capacity with the anchor nodes. A configuration component (e.g., the computing unit 100) may decide which tag devices should only perform proximity based measurements (i.e., using the tag-to-tag mode) and which tag devices need to measure exact three-dimensional positions (i.e., using the tag-to-anchor mode), or may decide on a positioning frequency, in order to avoid channel saturation without losing necessary positioning information.

With the tag-to-tag ranging mode, instead of using a trivial movement trigger, more advanced ranging activation mechanisms may be employed. For example, the ranging trigger mechanism for the remaining tag devices may be movement based, wherein, in accordance with the ranging trigger mechanism, the proximity based ranging measurements performed by the remaining tag devices with the master tag device may be triggered when movement measurements of the remaining tag devices exceed a predetermined threshold. The threshold may be zone-specific, i.e., the predetermined threshold may be defined per zone of the localization area, for example. In order to avoid collisions, a start time of triggering the proximity based measurements performed by the remaining tag devices with the master tag device may be shifted by a random delay for at least one tag device among the remaining tag devices. In another variant, zero measurements may be issued while movement is attempted to be detected repeatedly and the proximity based ranging measurements may be triggered once repeated movement is then detected. In this variant, the ranging trigger mechanism for the remaining tag devices may also be movement based, wherein, in accordance with the ranging trigger mechanism, the proximity based ranging measurements performed by the remaining tag devices with the master tag device may not be triggered until repeated movement of the remaining tag devices is detected. In this way, unnecessary use of radio resources to detect movement may be avoided while the tag devices do not leave a palette.

As said, the updated positioning configuration may not only comprise updated settings regarding a ranging configuration used for positioning, but also regarding a communication configuration used for communication within the positioning system (e.g., between the set of tag devices and the set of anchor nodes). While it will be understood that various communication-related settings may generally be updated, in one variant, the updated settings regarding the communication configuration may particularly include at least one of a selection of a communication channel to be used for communication within the positioning system and updated settings regarding a radio transmission power used for communication within the positioning system.

Figure 3:
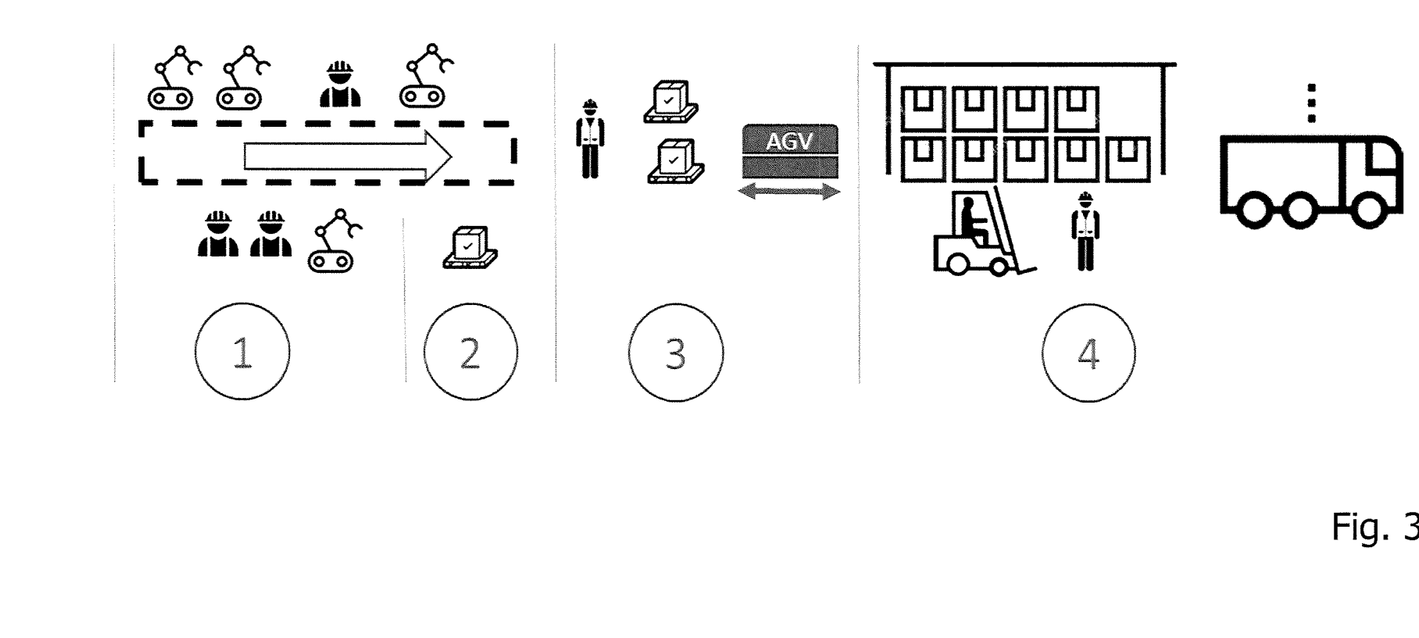
FIG. 3 illustrates an exemplary industrial process in which the technique presented herein may be practiced.

FIG. 3 illustrates an exemplary industrial process in which the technique presented herein may be practiced and which illustrates the flexibility and advantages associated therewith. In the shown example, the industrial process corresponds to an industrial production process which is subdivided into four stages, wherein each stage corresponds to a different use case associated with different positioning requirements. The positioning requirements essentially remain the same within the respective stage (i.e., as long as products being manufactured pass through the same stage), whereas the positioning requirements may change between the different stages. Each stage may be associated with a corresponding zone of the localization area and the positioning configuration may be dynamically updated when the products (together with their attached tag devices) move from one zone to another, e.g., by crossing predetermined geofences separating the zones.

As can be seen from the figure, zone "1" of the localization area corresponds to an assembly line area with conveyor belts, robotic arms and workers around corresponding workstations. In this zone, high-frequency and high-precision three-dimensional positioning may be required for slow-moving products and typical worker movement patterns. The ranging protocol settings may thus be configured for real-time tracking purposes and three-dimensional high-precision positioning, e.g., using the TWR protocol. To reach higher precision, the measurements between tags and anchors may be repeated with higher frequency. If a product being manufactured stops moving, a low-power or sleep mode may be activated and, upon movement, real-time tracking may be reactivated, for example. For the communication protocol settings, there may be no communication limitations, so that the tag devices can receive updates at any time.

Zone "2" of the localization area corresponds to a temporary ad-hoc storage area with half-processed products and workers, for example. In this zone, lower frequency three-dimensional positioning may be required for barely moving products and workers moving them to the next workstation. Regarding the ranging protocol settings, there may be no need for high precision, but three-dimensional positioning may still be applied. Lower frequency positioning may be good enough and a sleeping policy may be applied for battery saving purposes when products are not moved. The communication protocol settings may be the same as in zone "1".

Zone "3" of the localization area corresponds to a transition area with products ready for warehouse placement and waiting for forklifts. Multiple products may be stacked together (e.g., on pallets) and may be moved simultaneously. Forklifts may look for specific products to be moved to specific warehouse lines, for example. Once products are placed in this zone, the ranging protocol settings may be changed to proximity based measurements, i.e., to the tag-to-tag ranging mode, to avoid measurement flooding when multiple tag devices are moved simultaneously. By measuring the proximity to the assigned palette master tag device, tracking by object identifiers and alerting on misplacement may be possible. With respect to communication aspects, firmware updates and anchor ranging may be restricted due to the tag-to-tag mode to save channel capacity. The saved channel capacity may rather be used for safety purposes, such as for alerting workers in case of close-by driving forklifts, for example. A palette identifier (e.g., represented by the master tag device) may be communicated via the cloud.

Zone "4" of the localization area corresponds to a warehouse area with an extremely high number of products stacked together on shelving systems and with forklifts and AGVs moving freely with workers, which may necessitate alerts to avoid accidents. In this zone, positioning of stored products may be downgraded to low-frequency proximity change detection, wherein shelves may be identified by anchor nodes through direct ranging measurements with the respective master tag devices. Regarding the ranging protocol settings, three-dimensional positioning may be applied to forklift and worker type tag devices, whereas for the stored products, direct proximity based (i.e., tag-to-tag) ranging to their assigned palette or shelf master tag device may be used. To enable long activity time with battery savings at the same time, certain sleep and wake-up logics may be applied instead of using traditional trivial movement triggers. In one such variant, movement may generally trigger wake-up and, when movement measurements (e.g., performed by an Inertial Measurement Unit (IMU) sensor) are above a zone-specific threshold (e.g., when an integrated distance from the IMU sensor is above the threshold), the ranging measurements may start. The start time may be shifted with a random delay per device to avoid collision. In another variant, zero movements may be issued while movement is attempted to be detected repeatedly and, once repeated movement is in fact detected, the proximity measurements may be started. Regarding communication protocol settings, by changing the settings to low radio transmission power, interference and radio channel capacity issues may be avoided. Channel capacity may therefore be saved to serve workers and forklifts by safety-related high-precision measurements.

Figure 4:
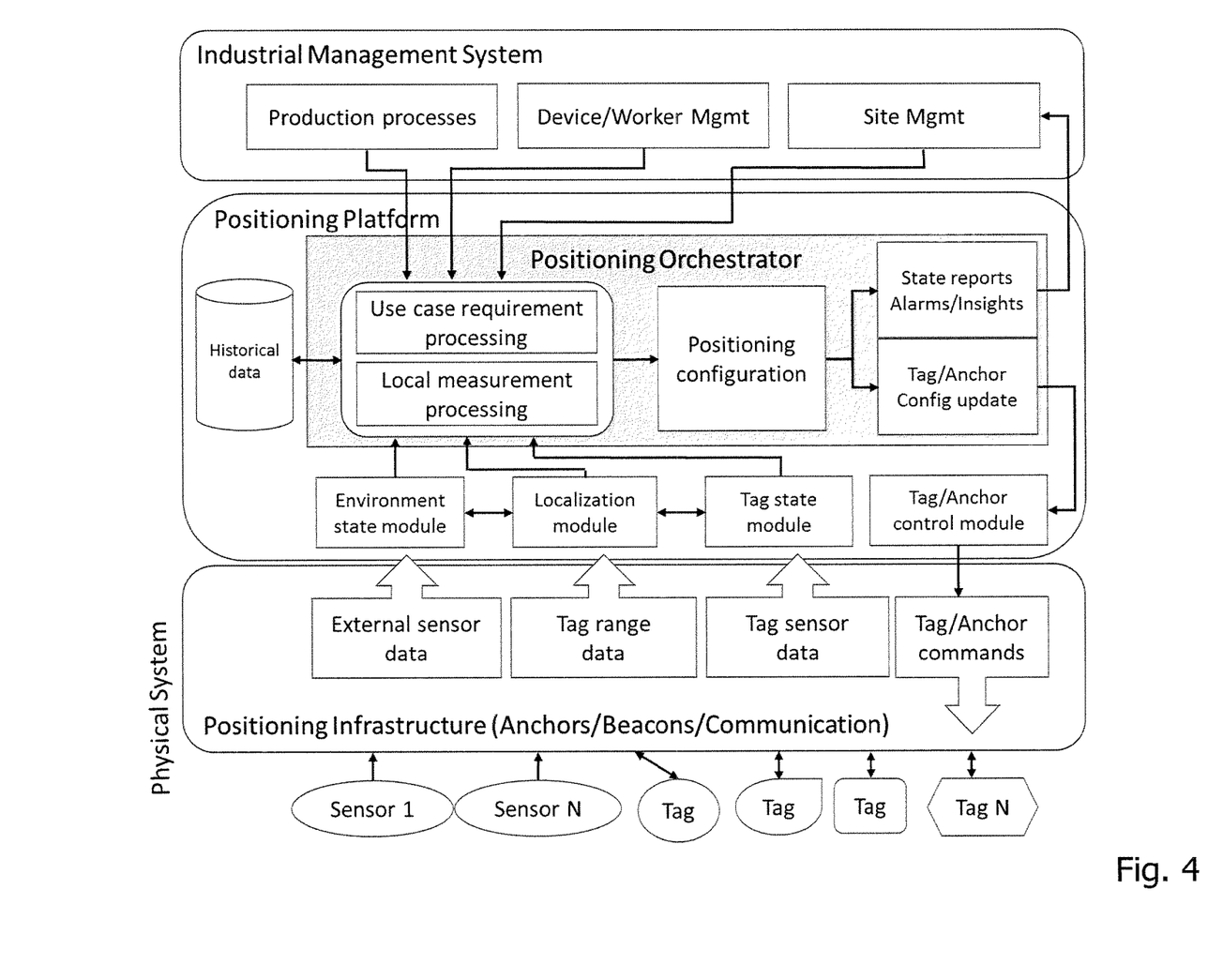
FIG. 4 illustrates an exemplary system which implements the technique presented herein.

FIG. 4 illustrates an exemplary system which implements the technique presented herein. The system comprises three subsystems, including a "physical system" comprising the anchor infrastructure and the tag devices, a "positioning platform" (e.g., corresponding to the computing unit 100) comprising the required localization and optimization modules, and an "industrial management system" that makes use of the optimization output of the positioning platform. Tag devices may be used to identify and track workers, assets and vehicles, for example. Such relation may be registered in a "device/worker management" module of the industrial management system, for example.

Tag devices may initiate ranging procedures based on their configuration, wherein the configuration parameters may be updated by a "tag/anchor control module" of the positioning platform. For localizing the tag devices and determining the updated positioning configurations, different kinds of local measurement data may be collected using diverse technologies. Tag devices may have multiple ranging components for this purpose (e.g., Bluetooth, WiFi, UWB, BLE, RFID, etc.) and may report "tag range data" to a "localization module" of the positioning platform. For example, when using UWB technology, the tag configuration may be set to TWR or TDOA, wherein, in the TWR mode, the tag devices may range the surrounding anchor nodes and the anchor nodes may report the measurements to the positioning platform and, in TDOA mode, the tag devices may only send a broadcast signal which is received by the anchor nodes which, in turn, may upload the timestamp of message arrival to the positioning platform.

The tag devices may also upload "tag sensor data" to a "tag state module" of the positioning system, wherein the tag sensor data may include the tag battery levels and other available sensor data, such as motion sensor data, for example. External sensors may additionally collect "external sensors data" and provide such data to an "environment state module" of the positioning platform. For example, the external sensors may monitor wired or wireless communication channels and provide information about traffic statistics or other per device statistics. Other types of environmental sensors may measure a zone temperature, a conveyor belt speed or vehicle speeds, for example. The physical system may support communication interfaces towards the positioning platform for the corresponding data flow, including Ethernet/UWB-TCP/IP gateways or Bluetooth-TCP/IP gateways, for example.

Once the local measurement data is received by the positioning platform, it may be saved as "historical data" into a historical database. The localization module may process the measured ranging data and may optionally use the historical data and configuration settings to choose from various calculation methods. The localization module may be responsible for the calculation of the tag positions, e.g., using trilateration methods, or may use the data in the historical database to create smooth paths and filter outliers, for example. The localization module, the tag state module and the environment state module may keep last known values and parameter sets for each of the handled tag devices and for the zones. The zones may be defined in a "site management" module of the industrial management system, for example.

A "positioning orchestrator" component of the positioning platform may be responsible for processing the system wide input data and for controlling the positioning-related modules of the positioning platform. To this end, the positioning orchestrator may perform so called "use case requirement processing" to determine the predefined positioning requirements per zone of the industrial site, as described above. These requirements may be derived from input data gathered from a "production processes" module of the industrial management system maintaining information about the production processes managed at the industrial site, and the input data may further be complemented by tracking classification information (e.g., tags attached to workers, objects or vehicles) obtained from the device/worker management module of the industrial management system, as well as complemented by site management related information (e.g., with respect to the zones and their geofences) obtained from the site management module of the industrial management system.

The positioning orchestrator may also perform so called "local measurement processing" to determine the results of the local measurements performed in the zones based on the data obtained from the localization module, the tag state module and the environment state module. Once the use case requirements and the local measurements are processed, a "positioning configuration" module of the positioning orchestrator may create updated positioning configurations, as described above. Depending on whether the requirements can be met or exceed the total system capacity, alarms or insights may be reported by a "state reports alarms/insights" module of the positioning orchestrator to the site management module to inform the industrial management system accordingly. The created configuration updates themselves may be dynamically assigned to the respective tag devices and/or the respective anchor nodes by the "tag/anchor configuration update" module, to thereby instruct the tag devices and/or the anchor nodes to apply reconfigurations in accordance with the updated positioning configuration, as described above.

The industrial management system may correspond to an existing industrial management system, e.g., provided in a factory, through which end-users may define the various roles for the objects or assets and workers and specify the zone-based use cases for manufacturing coordination, safety, security, and business intelligence, for example.

As has become apparent from the above, the present disclosure provides a technique for updating a positioning configuration in a positioning system based on predefined positioning requirements that depend on zones of the localization area in which a corresponding set of tag devices is currently located. The presented technique may as such allow dynamically applying positioning configurations in the positioning system to improve positioning results in complex industrial environments, such as along an industrial production process including factories and warehouses with tens of thousands of tags requiring continuous three-dimensional tracking, for example. As opposed to traditional local decisions of rule-based device configuration solutions, the presented technique may be based on a system-level approach which may involve collecting state measurements from environmental and tag device sensors, communication statistics (e.g., using Key Performance Indicators (KPIs)) and use case based positioning settings, to thereby enable the detection of circumstances which require a configuration update for a given set of tag devices. The method may thus consider system-level capacity limitations and may generate alerts for missed requirements, for example.

The presented technique may generally enable the tracking of a high number of tag devices, even when the tag devices are in close vicinity to each other, while avoiding collisions of parallel requests at the same time. The technique may achieve channel capacity savings by applying a wide range of configurations for good-enough positioning that may satisfy the requirements of a particular use case. The technique may provide information to maintain production safety and efficiency while saving communication resources and battery capacity, for example. Further, the technique may solve the problem of capacity limited systems where simple motion-based solutions may not function properly, such as when a high number of tags located on the same warehouse shelf unit is simultaneously motion-triggered, which would result in measurement flooding with traditional systems. The dynamic configuration may as such enable downgraded positioning support particularly adapted for objects stored on shelves.

The presented technique may generally integrate heterogeneous devices and positioning technologies in a single system, wherein the solution may easily be integrated into existing positioning platform management systems. If the same radio technology (e.g., UWB) is used for both management and communications, a simple hardware design may be possible and, by creating action triggers and dynamic configuration of tag devices based on specific situations and environmental factors, tracking tags can leverage area and proximity-level information to prevent unnecessary measurements, activity time and use of computational resources.

It is believed that the advantages of the technique presented herein will be fully understood from the foregoing description, and it will be apparent that various changes may be made in the form, constructions and arrangement of the exemplary aspects thereof without departing from the scope of the invention or without sacrificing all of its advantageous effects. Because the technique presented herein can be varied in many ways, it will be recognized that the invention should be limited only by the scope of the claims that follow.

The invention claimed is:

1. A method for updating a positioning configuration in a positioning system comprising a plurality of anchor nodes for determining positions of tag devices within a localization area using radio technology, the method comprising:
   determining an updated positioning configuration for at least one of a set of tag devices and a set of anchor nodes of the positioning system based on predefined positioning requirements that depend on a zone of the localization area in which the set of tag devices is currently located; and
   applying the updated positioning configuration to the at least one of the set of tag devices and the set of anchor nodes,
   wherein the updated positioning configuration comprises at least one updated setting regarding at least one of: a ranging configuration used for positioning, and a communication configuration used for communication within the positioning system,
   wherein the updated settings regarding the ranging configuration include updated settings regarding a specific positioning technology to be used for positioning, including at least one of: a ranging protocol to be used for positioning, a ranging frequency to be applied for positioning, a ranging trigger mechanism to be used for triggering ranging measurements used for positioning, a selection of one of a tag-to-tag ranging mode and a tag-to-anchor ranging mode to be used for positioning, and a power saving mode to be applied when performing ranging measurements, and
   wherein the selection of the tag-to-tag ranging mode includes determining a master tag device among the set of tag devices with which the remaining tag devices of the set of tag devices perform pairwise proximity based ranging measurements, wherein only the master tag device is configured to perform tag-to-anchor ranging measurements representative for the whole set of tag devices, whereas positioning of other tag devices in close proximity to the master tag device is performed relative to the master tag device instead of relative to the set of anchor nodes.

2. The method of claim 1, wherein the localization area comprises a plurality of zones each being associated with different predefined positioning requirements, wherein determining and applying the updated positioning configuration is performed when the set of tag devices moves from one zone to another zone of the plurality of zones.

3. The method of claim 1, wherein the predefined positioning requirements further depend on a tracking classification of the set of tag devices.

4. The method of claim 1, wherein the updated positioning configuration is further determined based on positioning related capabilities of tag devices of the set of tag devices.

5. The method of claim 1, wherein the updated positioning configuration is further determined based on results of local measurements performed in the zone of the localization area in which the set of tag devices is currently located.

6. The method of claim 5, wherein the results of the local measurements comprise at least one of:
   results of ranging measurements performed by the set of tag devices,
   results of measurements performed by tag device sensors measuring states of tag devices of the set of tag devices, and
   results of measurements performed by external sensors measuring environmental states in the zone of the localization area in which the set of tag devices is currently located.

7. The method of claim 6, wherein the environmental states relate to utilization rates of communication channels used within the positioning system.

8. The method of claim 5, wherein at least some of the results of the local measurements are indicative of a utilization of capacity limits of the positioning system.

9. The method of claim 8, wherein, when the predefined positioning requirements cannot be fulfilled due to the capacity limits of the positioning system, the method further comprises:
   generating a report on which requirements cannot be fulfilled.

10. The method of claim 9, further comprising:
    triggering an alert based on the generated report.

11. The method of claim 1, wherein each tag device of the set of tag devices is equipped with a plurality of positioning components to support different positioning technologies, wherein the updated settings regarding the ranging configuration include a selection of one or more of the positioning technologies to be used for positioning.

12. The method of claim 1, wherein the ranging trigger mechanism for the remaining tag devices is movement based, wherein, in accordance with the ranging trigger mechanism, the proximity based ranging measurements performed by the remaining tag devices with the master tag device are triggered when movement measurements of the remaining tag devices exceed a predetermined threshold.

13. The method of claim 12, wherein the predetermined threshold is defined per zone of the localization area.

14. The method of claim 12, wherein a start time of triggering the proximity based ranging measurements performed by the remaining tag devices with the master tag device is shifted by a random delay for at least one tag device among the remaining tag devices.

15. The method of claim 1, wherein the ranging trigger mechanism for the remaining tag devices is movement based, wherein, in accordance with the ranging trigger mechanism, the proximity based ranging measurements performed by the remaining tag devices with the master tag device are not triggered until repeated movement of the remaining tag devices is detected.

16. The method of claim 1, wherein the updated settings regarding the communication configuration include at least one of:

a selection of a communication channel to be used for communication within the positioning system, and updated settings regarding a radio transmission power used for communication within the positioning system.

17. A non-transitory computer-readable medium comprising, stored thereupon, a computer program product comprising program code portions configured for execution by one or more computing devices and configured to cause the one or more computing devices to carry out the method of claim 1.

18. A computing apparatus for updating a positioning configuration in a positioning system comprising a plurality of anchor nodes for determining positions of tag devices within a localization area using radio technology, the computing apparatus comprising at least one processor and at least one memory, the at least one memory containing instructions executable by the at least one processor such that the computing unit is configured to perform the method of claim 1.

19. A system comprising a computing unit according to claim 18.

* * * * *